United States Patent
Ambrose

(10) Patent No.: US 10,267,379 B2
(45) Date of Patent: Apr. 23, 2019

(54) COUNTERWEIGHT ASSEMBLY

(71) Applicant: SSW Holding Company, Inc., Fort Smith, AR (US)

(72) Inventor: Jeffrey Alan Ambrose, Evansville, IN (US)

(73) Assignee: SSW HOLDING COMPANY, LLC, Dallas, TX (US)

( * ) Notice: Subject to any disclaimer, the term of this patent is extended or adjusted under 35 U.S.C. 154(b) by 0 days.

(21) Appl. No.: 15/029,009

(22) PCT Filed: Oct. 16, 2014

(86) PCT No.: PCT/US2014/060794
§ 371 (c)(1),
(2) Date: Apr. 13, 2016

(87) PCT Pub. No.: WO2015/057905
PCT Pub. Date: Apr. 23, 2015

(65) Prior Publication Data
US 2016/0258508 A1  Sep. 8, 2016

Related U.S. Application Data

(60) Provisional application No. 61/892,611, filed on Oct. 18, 2013.

(51) Int. Cl.
*F16F 15/28* (2006.01)
*D06F 37/26* (2006.01)

(52) U.S. Cl.
CPC ............ *F16F 15/28* (2013.01); *D06F 37/265* (2013.01)

(58) Field of Classification Search
CPC .......... F16F 15/28; F16F 15/32; D06F 37/265
(Continued)

(56) References Cited

U.S. PATENT DOCUMENTS 2,937,834 A * 5/1960 Orenick .................... F16L 3/14
174/40 CC
3,185,255 A * 5/1965 Bird ...................... D06F 37/265
188/378

(Continued)

FOREIGN PATENT DOCUMENTS

CN          202251657 U      5/2012
EP          1270791 A2       1/2003
(Continued)

OTHER PUBLICATIONS

International Search Report for application No. PCT/US2014/060794, dated Feb. 9, 2015.

*Primary Examiner* — Muhammad Ijaz
(74) *Attorney, Agent, or Firm* — Marshall, Gerstein & Borun LLP

(57) ABSTRACT

A counterweight assembly includes a counterweight and at least one retention member. The counterweight is formed of concrete or other heavy aggregate material. The at least one retention member is coupled to the counterweight and extends outwardly away from the counterweight. The at least one retention member is further adapted to be at least partly disposed through an aperture in a counterweight receiving component such as an appliance component to retain the counterweight in operable connection with the counterweight receiving component.

18 Claims, 20 Drawing Sheets

(58) Field of Classification Search
USPC ... 248/648, 123.2, 406.2, 182.1, 217.1, 325, 248/331, 364, 910; 68/23.2
See application file for complete search history.

(56) References Cited

U.S. PATENT DOCUMENTS

| | | | | |
|---|---|---|---|---|
| 4,250,724 | A * | 2/1981 | Altnau | D06F 37/24 210/363 |
| 6,264,393 | B1 * | 7/2001 | Kraus | B60R 13/0206 24/297 |
| 2003/0029206 | A1 * | 2/2003 | Cho | D06F 37/265 68/23.2 |
| 2010/0148026 | A1 * | 6/2010 | Jang | G06F 1/1607 248/224.8 |
| 2011/0094432 | A1 * | 4/2011 | Petersen | B63B 21/243 114/294 |
| 2012/0242211 | A1 * | 9/2012 | Chang | F16M 11/041 312/351.1 |

FOREIGN PATENT DOCUMENTS

| | | |
|---|---|---|
| EP | 1426477 A2 | 6/2004 |
| KP | 20050004632 | 1/2005 |

* cited by examiner

US 10,267,379 B2

COUNTERWEIGHT ASSEMBLY

CROSS-REFERENCE TO RELATED APPLICATIONS

This is a U.S. National Phase of International Patent Application No. PCT/US2014/060794, filed Oct. 16, 2014, which claims the benefit of priority of U.S. Provisional Patent Application 61/892,611, filed Oct. 18, 2013. The entire contents of each of the foregoing is expressly incorporated herein by reference.

FIELD OF THE DISCLOSURE

The present disclosure is directed to counterweight assemblies, which are common within many products including appliances such as washers, dryers, ranges, dishwashers and refrigerators, etc., consumer products including file cabinets, chairs, sofas, tables, chests, cabinets, shelving systems, etc., or other consumer products that conceivably could use counterweights, for balancing various mechanical loads and/or forces.

BACKGROUND

Conventional counterweights are secured to a portion of a product such as an appliance, for example, through the use of fastening hardware like bolts, nuts, washers, screws, straps, etc. These fasteners add additional cost and labor for assembly.

GENERAL DESCRIPTION

Figure 1:
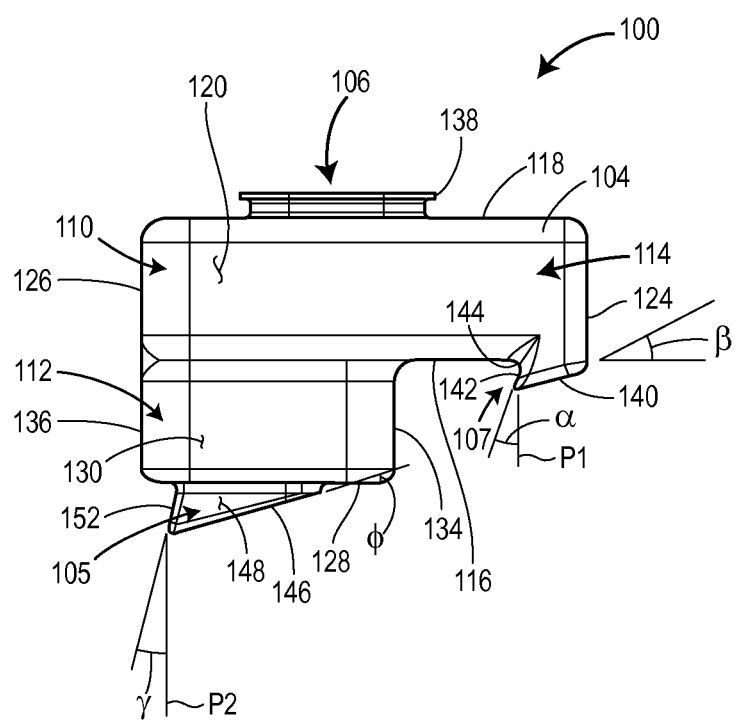
FIG. 1 is a side view of one version of a counterweight of the present disclosure.
Figure 5:
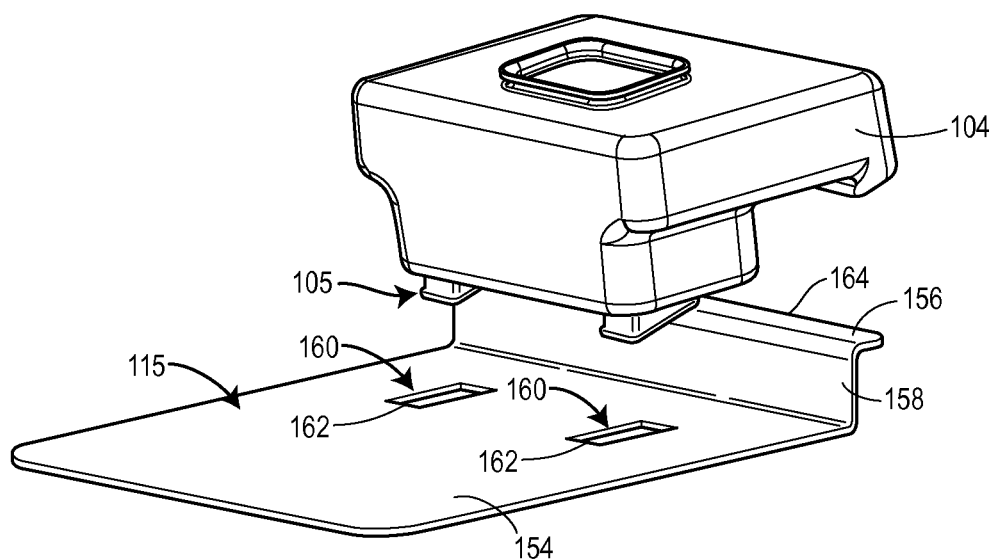
FIG. 5 is an exploded perspective view of an assembly of the present disclosure including the counterweight of FIG. 1 and a counterweight receiving component.

The present disclosure provides a counterweight assembly 100 design that eliminates or reduces the need for fastening hardware. The counterweight assembly 100 may snap in, or attach via an interference fit, or other fastener free mechanism. The counterweight assembly 100 may or may not utilize a housing 104 such as blow molded plastic depicted in FIGS. 1-7 and FIGS. 12-18, for example. The housing 104 encapsulates a concrete and/or other high specific gravity, heavy aggregate material making up the counterweight assembly 100. A pour spout 106 may be incorporated into the blow molded plastic housing, as shown in FIG. 1 for example, to facilitate filling the molded plastic with concrete or other heavy aggregate material as is known in the prior art. The counterweight assembly 100 may have one or more retention members 105 that can be inserted into aperture(s) 160 of a counterweight receiving component 115 of an appliance, as shown in FIG. 5, for example. The design of the retention members 105 can be such that they flex or conform enough to allow secure placement onto the counterweight receiving component 115. The counterweight assembly 100 may be placed onto the counterweight receiving component 115 through the use of an installer's hands or with a simple tool such as a mallet.

Counterweight receiving components 115 may include: sheet metal base or sidewalls, washing machine drums, dryer drums, motors, motor housings, or other component parts of appliances or other mechanical devices including, for example, consumer products such as file cabinets, chairs, sofas, tables, chests, tool cabinets, shelving systems, etc. Once inserted into the aperture(s) 160, the retention members 105 form a locked in, interference fit that holds the counterweight in place without the use of fastening hardware such as bolts, nuts, washers, screws and the like. Of course, straps or other fastening hardware may be utilized, as well, if so desired.

Figure 6:
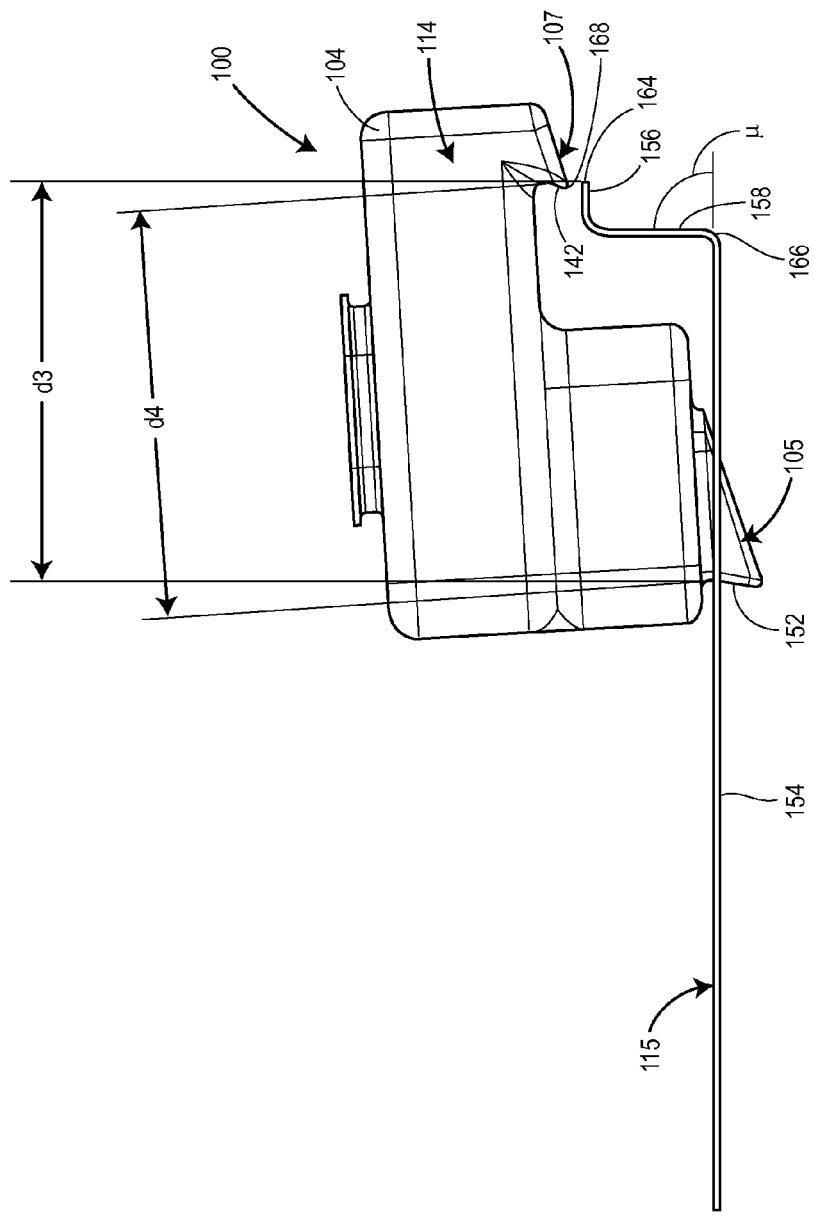
FIG. 6 is a side view of the assembly of FIG. 5 with retention members of the counterweight partially inserted into apertures of the counterweight receiving component.
Figure 7:
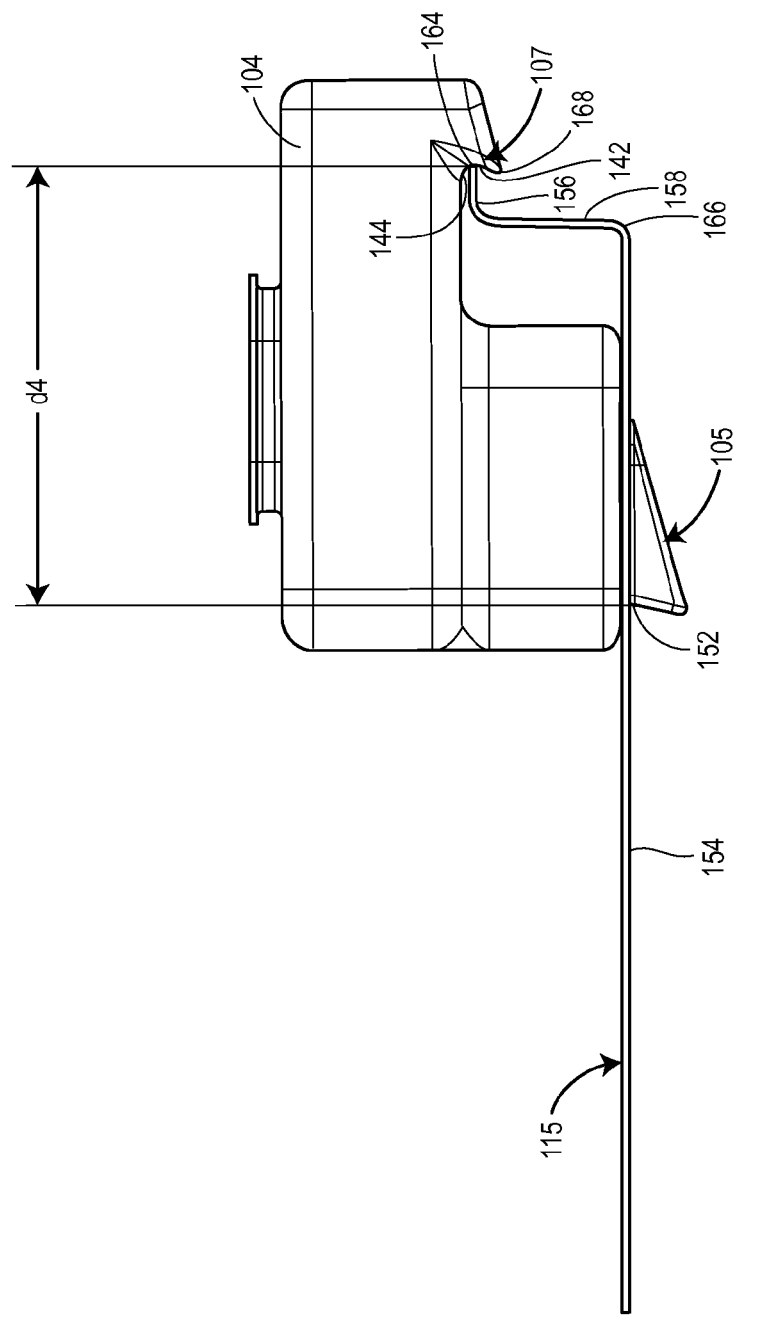
FIG. 7 is a side view of the assembly of FIG. 5 with the retention members of the counterweight completely inserted into the apertures of the counterweight receiving component.
Figure 8:
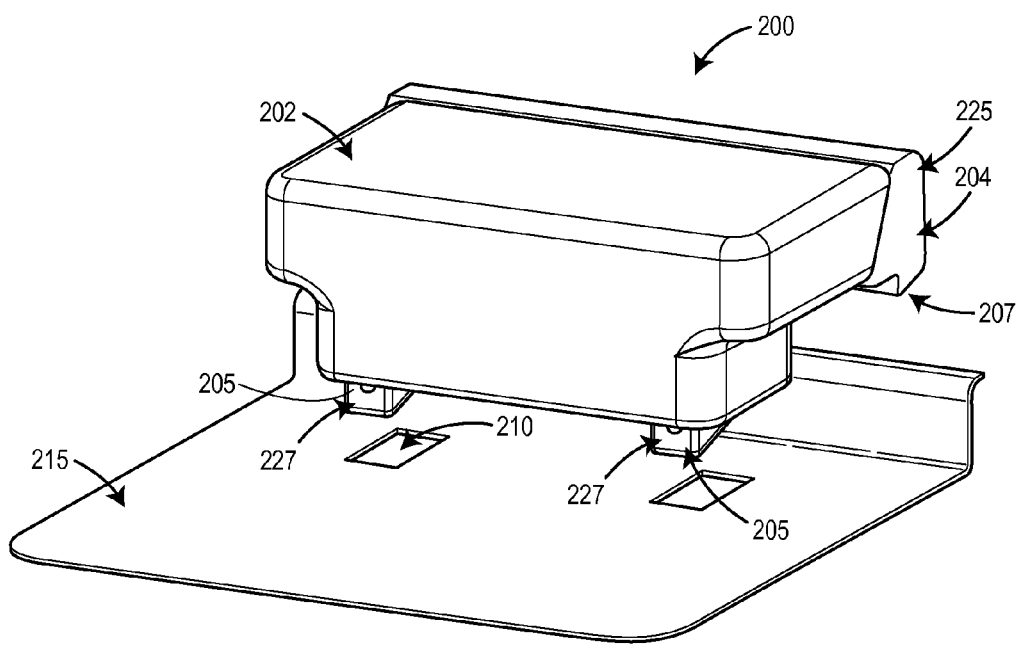
FIG. 8 is an exploded view of an alternate assembly of the present disclosure including an alternate counterweight and a counterweight receiving component.

Alternatively, in certain embodiments the counterweight assembly 100 may utilize, in coordination with the retention members 105, a retention flange 107, such as that illustrated in FIG. 1, that further helps seat and hold the counterweight in place when assembled to the counterweight receiving component 115, as can be seen in FIGS. 6-7.

In the absence of the complete elastic housing 104 disclosed in FIGS. 1-7, a wet or dry cast concrete counterweight assembly 200 may alternatively include a housing 204 that includes plastic sleeves or inserts 225, 227 placed onto the retention member(s), such as illustrated in FIGS. 8-11. These sleeves or inserts 225, 227 then act in a similar manner as the housing when the retention members are placed in apertures of counterweight receiving components. The sleeves or inserts 225, 227 may utilize design elements that help further hold the counterweight assembly 200 in place without the use of traditional fastening hardware such as bolts, nuts, washers, screws and the like. In addition, cast iron type counterweights may also be utilized.

This type of improved counterweight assembly can be used in a variety of configurations including but not limited to counterweight receiving components that are: formed sheet metal or plastic such as 90 degree angles or other angles (as shown in FIGS. 1-11); rounded surfaces of metal or plastic (as shown in FIGS. 12-15); and flat, planar surfaces such as sheet metal or plastic (as shown in FIGS. 16-19).

An alternate embodiment (not shown in the figures) is a dry cast, wet cast or cast iron counterweight that could be utilized with counterweight receiving components that are rounded surfaces of metal or plastic (e.g., similar as shown in FIGS. 12-15) that utilize sleeves.

DETAILED DESCRIPTION OF FIGURES

Referring now to FIGS. 1-7, one version of a counterweight assembly 100 constructed in accordance with the present disclosure includes a counterweight 102 (see, e.g., FIG. 2A) disposed inside of a housing 104. Generally, the housing 104 can include a plastic container that generally completely surrounds and/or envelops the counterweight 102. The housing 104 can define a pour spout 106 and an interior cavity 108. The housing 104 can be formed by blow-molding, thermo-forming, injection molding, casting, stereo-lithography, 3D printing, pressing, cold-firming or generally any other foreseeable process. The housing 104 can include a single piece of material or can include multiple pieces connected (e.g., bonded, welded, glued, etc.) together to form the shape illustrated. The counterweight 102 can include a concrete and/or other high specific gravity, heavy aggregate material that can be, for example, that is poured into the interior cavity 108 of the housing 104 wet and then allowed to dry into a solid assuming the shape of the interior cavity 108. So configured, in the version of the assembly 100 disclosed in FIGS. 1-7, the counterweight 102 and the housing 104 become coupled together at least by virtue of the geometry of the housing 104. Also, in some versions, the counterweight 102 and housing 104 may bond together through some degree of adhesion.

Figure 2:
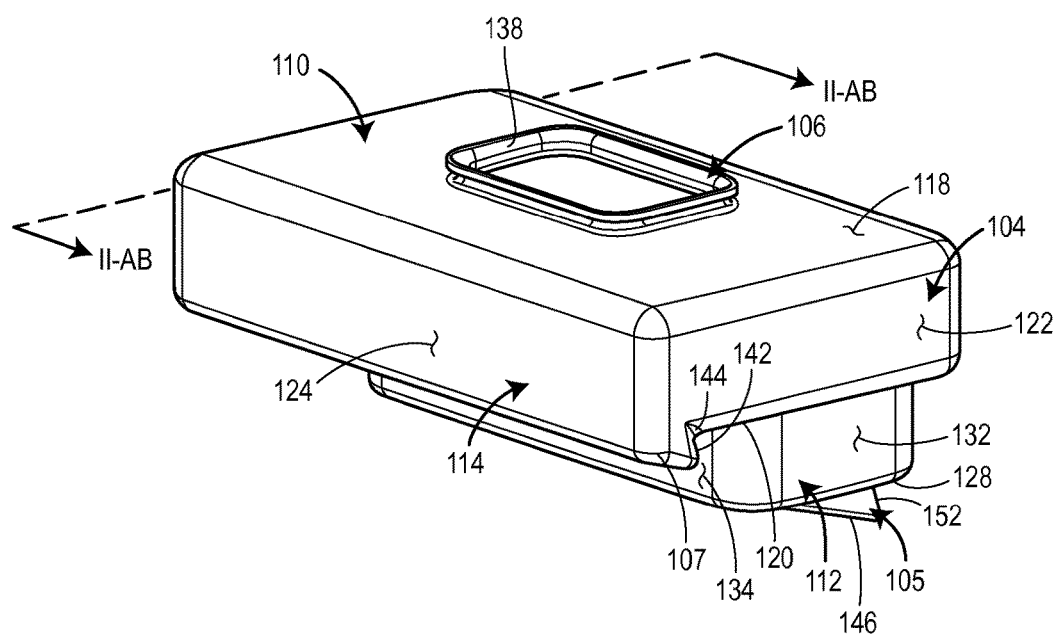
FIG. 2 is a perspective view of the counterweight of FIG. 1.

As depicted in FIGS. 1-4, the counterweight assembly 100 of this version includes a body portion 110 and a base portion 112. Each of the body portion 110 and the base portion 112 is generally box-shaped with the base portion 112 having smaller dimensions than the body portion 110. So configured, the body portion 110 includes a tongue portion 114 that extends outward at 90° and beyond the base portion 112, as shown in FIG. 2.

Figure 3:
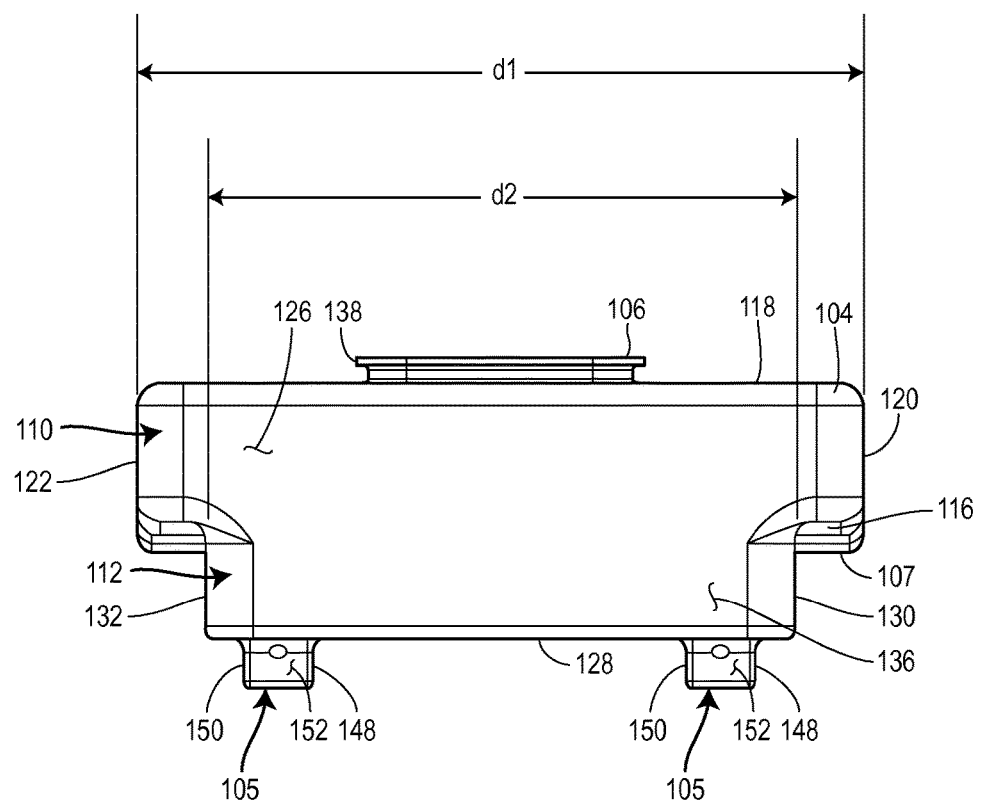
FIG. 3 is a back view of the counterweight of FIG. 1.
Figure 4:
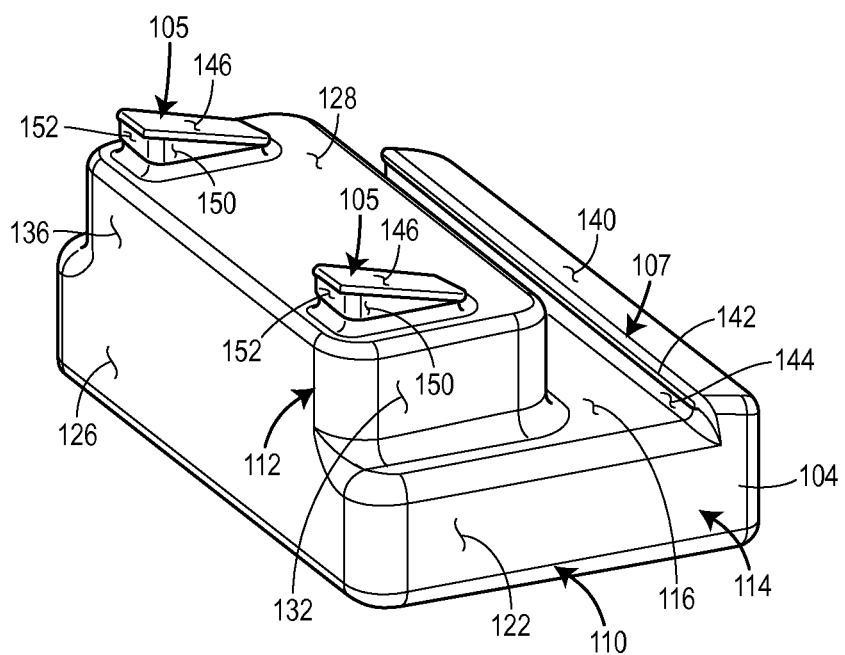
FIG. 4 is a bottom perspective view of the counterweight of FIG. 1.

Relative to the orientation of the counterweight assembly 100 depicted in FIGS. 1-3, the body portion 110 includes a top wall 118, a bottom wall 116, opposing left-side and right-side walls 120, 122, and opposing front-side and back-side walls 124, 126. Similarly, the base portion 112 includes a bottom wall 128, opposing left-side and right-side walls 130, 132, and opposing front-side and back-side walls 134, 136. The back-side walls 126, 136 of the body and base portions 110, 112 are coplanar and contiguous. The base portion 112 does not have a top wall because it joins the bottom wall 116 of the body portion 110 where the top wall would otherwise reside. Also, as shown in FIG. 3, in this version a distance d1 between the opposing left-side and right-side walls 120, 122 of the body portion 110 is greater than a distance d2 between the opposing left-side and right-side walls 130, 132 of the base portion 112.

As can be seen in FIGS. 1-3, for example, the pour spout 106 of the counterweight assembly 100 is defined in the top wall 118 of the body portion 110 and includes a generally rectangular shaped opening surrounded by a flared perimeter lip 138. It should be understood that the top/bottom, left/right, front/back designations used immediately above to describe the various walls of the body portion 110 and base portion 112 of the present version of the counterweight assembly 100 are only for convenience and the counterweight assembly 100 does not necessarily always occupy the orientation associated with those designations.

In addition to the foregoing, and as briefly mentioned above, the present version of the counterweight assembly 100 includes a pair of retention members 105 and a retention flange 107. The retention flange 107 extends outwardly away from the bottom wall 116 of the body portion 110, at the terminal end of the tongue portion 114. In the disclosed version, the retention flange 107 extends continuously entirely along the width of the tongue portion 114 of the body portion 110. But, in other versions, the retention flange 107 can extend less than the entire length or the body portion 110 and/or the retention flange 107 can be divided into a plurality of sub-flanges separated by gaps or spaces along the length of the tongue portion 114 of the body portion 110. As seen in FIG. 1, for example, the retention flange 107 includes an end surface 140 disposed away from the bottom wall 116 of the body portion 110 and a locking surface 142. In this version, the locking surface 142 extends between the end surface 140 and the bottom wall 116 and joins or blends into the bottom wall 116 of the body portion 110 via a concave radiused surface 144. In other versions, it is foreseeable that the locking surface 142 could directly intersect with the bottom wall 116 without the radiused surface 144.

With reference to FIG. 1, the end surface 140 of the retention flange 107 in this version is disposed at an angle $\beta$ relative to the bottom wall 116 of the body portion 110 of the counterweight assembly 100. The angle $\beta$ can be in a range of approximately 0° to approximately 75° or otherwise. The locking surface 142 in this version is disposed at an angle $\alpha$ relative to a plane P1 that is perpendicular to the bottom wall 116 of the body portion 110 of the counterweight assembly 100. The angle $\alpha$ can be in a range of approximately 0° to approximately 75°, for example. In one version, the angle $\alpha$ can be in a range of approximately 5° and approximately 45° and, can preferably be approximately 15°. So configured, the retention flange 107 of this version forms a hook or barb shape when viewed from this side as in FIG. 1, for example. As will be described below in reference to FIGS. 5-7, this hook or barb shape, at least partially the result of the angle $\alpha$ of the locking surface 142 helps to prevent the counterweight assembly 100 from unintentionally detaching from a counterweight receiving component 115.

Still referring to FIGS. 1-4, the pair of retention members 105 of this version of the counterweight assembly 100 also serve to prevent the counterweight assembly 100 from unintentionally detaching from a counterweight receiving component 115. Each retention member 105 includes a wedge-shaped member extending away from the bottom wall 128 of the base portion 112 of the counterweight assembly 100. In the present version, the retention members 105 extend away from the base portion 112 in the same direction that retention flange 107 extends away from the body portion 110, as depicted in FIG. 1, for example. That is, each of the retention members 105 and the retention flange 107 extends downward relative to the remainder of the counterweight assembly 100 in relation to the orientation of the counterweight assembly 100 of FIG. 1. As mentioned, each retention member 105 is generally wedge-shaped and includes a ramp surface 146, opposing left-side and right-side surfaces 148, 150, and a locking surface 152. The ramp surface 146 extends at an angle φ relative to the bottom wall 128 of the base portion 112 of the counterweight assembly 100. The angle φ can be in a range of approximately 0° to approximately 75° and, in one version, can be approximately 30°. The locking surface 152 extends at an angle γ relative to a plane P2 that extends perpendicular to the bottom wall 128 of the base portion 112 of the counterweight assembly 100. The angle γ can be in a range of approximately 0° to approximately 75°. In one version, the angle γ can be in a range of approximately 5° and approximately 45° and, can preferably be approximately 30°. So, configured, each retention member 105 is generally wedge-shaped but the angle locking surface 152 forms a barb or hook shape for helping retain the counterweight assembly 100 in position on a receiving component 115, as will be described.

Figure 2A:
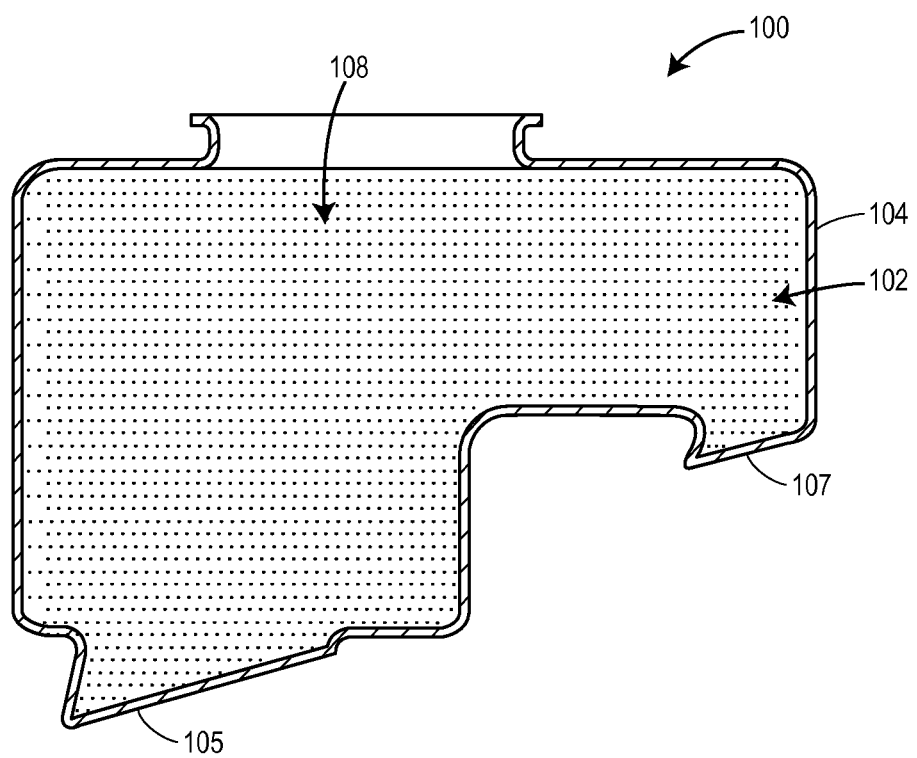
FIG. 2A is a cross-sectional side view of a first version of the counterweight of FIGS. 1 and 2, taken thought line II-AB of FIG. 2.
Figure 2B:
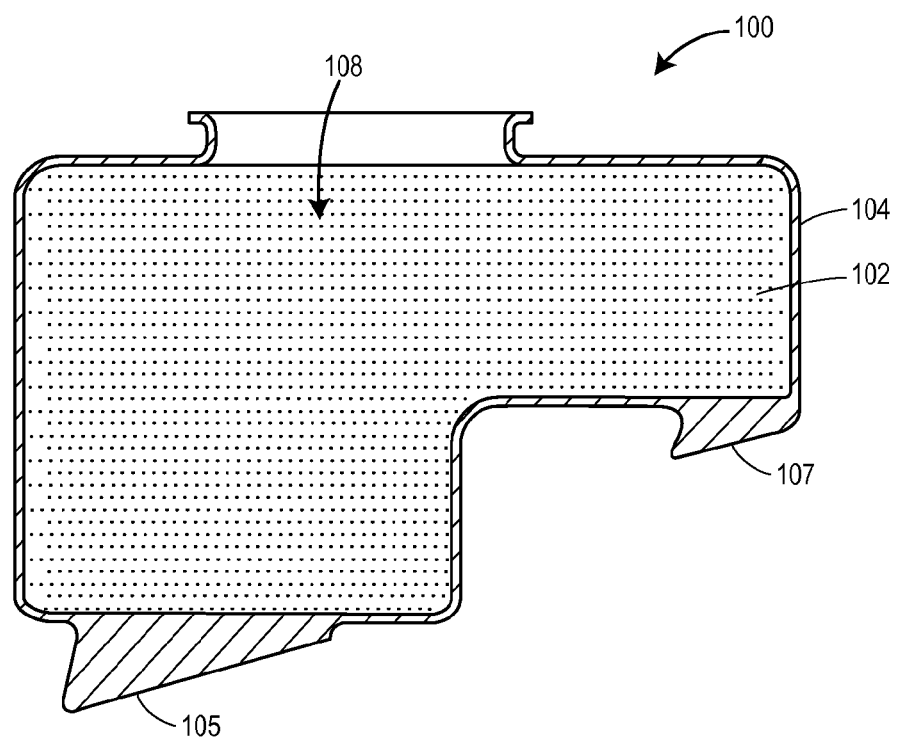
FIG. 2B is a cross-sectional side view of a second version of the counterweight of FIGS. 1 and 2, taken thought line II-AB of FIG. 2.

As mentioned above, the counterweight assembly 100 includes the housing 104 and the counterweight 102 disposed and formed within the interior cavity 108 of the housing 104, as depicted in FIG. 2A. FIG. 2A also depicts the cross-sectional construction of one version of the housing 104. Particularly, in one version of the counterweight assembly 100, the walls 114-134 of the housing 104 that define the geometry of the retention flange 107 and retention members 105 have a uniform thickness such that the counterweight 102 fills voids in the housing 105 that also reside within the retention flange 107 and retention members 105. In another version shown in FIG. 2B, for example, the walls 114-134 may be generally uniform in thickness, but the retention flange 107 and retention members 105 are solid and are not filled by the counterweight 102 material. In some other versions only the retention flange 107 could be filled with counterweight material, or only the retention members 105 could be filled with counterweight material.

As suggested above, the angled locking surfaces 142, 152 of the retention flange 107 and retention members 105 are intended to secure the counterweight assembly 100 to a counterweight receiving component 115. FIGS. 5-7 disclose one version of a counterweight receiving component 115, adapted to receive the counterweight assembly 100 of FIGS. 1-4 of the present disclosure. The receiving component 115 can be, for example, a sheet metal base or appliance sidewall, a washing machine drum, a dryer drum, a motor, a motor housing, or any other component or part of an appliance or other mechanical device including, for example, consumer products such as file cabinets, chairs, sofas, tables, chests, cabinets, shelving systems, etc. In the version depicted, the receiving component 115 includes a generally planar base plate portion 154, a flange portion 156, and an intermediate portion 158 extending between the base plate portion 154 and the flange portion 156. In one version, which will be described below, the intermediate portion 158 extends at an angle μ relative to the base plate portion 154 and flange portion 156 in order to provide a spring-biased function that further assists with the attachment of the counterweight assembly 100. In one version, in an undeformed state shown in FIG. 6, for example, the angle μ can be in a range of approximately 45° to approximately 85°. In the depicted version, the angle μ can be approximately 80°. The base plate portion 154 defines a pair of apertures 160 corresponding in size and location with the pair of retention members 105 on the counterweight assembly 100. In the present version, each aperture 160 is generally rectangular and defines a locking edge 162. The flange portion 156 of the receiving component 115 also defines a locking edge 164.

To attach the counterweight assembly 100 to the receiving component 115, the retention members 105 are aligned with and inserted into the apertures 160 in the base plate portion 154 and the retention flange 107 is positioned adjacent to the flange portion 156, as depicted in FIG. 6. As the retention members 105 are urged through the apertures 160, the locking surfaces 152 contact and engage the locking edges 162 of the apertures 160 in the base plate portion 154 of the receiving component 115. Generally simultaneously, the locking surface 142 of the retention flange 107 on the counterweight assembly 100 also contacts and engages the locking edge 164 on the flange portion 156 of the receiving component 115. Frictional engagement of the locking surfaces 142, 152 and the respective locking edges 162, 164 secure the counterweight assembly 100 and receiving component 115 together and the angled locking surfaces 142, 152 serve to reduce the likelihood of undesired detachment. That is, in order to detach the counterweight assembly 100 from the receiving component 115, the counterweight assembly 100 must be displaced in a direction directly away from the locking edges 162, 164 (e.g., to the right relative to the orientation in FIG. 7) and also in a direction lateral to the plane in which the receiving component 115 resides (e.g., up relative to the orientation of FIG. 7).

In other examples, the receiving component 115 itself may further serve to retain the counterweight assembly 100 in position. That is, in one version mentioned above, the intermediate portion 158 of the receiving component 115 extends at the angle μ when occupying the undeformed state depicted in FIG. 6. In this state, a lateral distance d3 between the locking edges 62, 64 (see, FIG. 6) on the receiving component 115 may be larger than a corresponding lateral distance d4 between the locking surfaces 142, 152 on the counterweight assembly 100. As such, to attach the counterweight assembly 100 to the receiving component 115, the retention members 105 are first positioned inside of the corresponding apertures 160 in the base plate portion 154 of the receiving component 115, as shown in FIG. 6. With the locking surfaces 152 of the retention members 105 in contact with the locking edges 162 of the corresponding apertures 160, the retention flange 107 can be forced into attachment with the flange portion 156 of the receiving component 115. Specifically, the counterweight assembly 100 can be pivoted about the contact point between the retention members 105 and the locking edges 162 of the apertures 160 such that the tongue portion 114 and retention flange 107 move toward and into engagement with the flange portion 156, as shown in FIG. 7.

As the counterweight assembly 100 moves from the position depicted in FIG. 6 to the position depicted in FIG. 7, the intermediate portion 158 of the receiving component 115 pivots about its interface 166 with the base plate portion 154 of the receiving component 115 in the counter-clockwise direction relative to the orientation of FIGS. 6 and 7. This pivoting movement causes the magnitude of the angle μ of the intermediate portion 158 relative to the base plate portion 154 to increase such that the lateral distance d3 between the locking edges 162, 164 of the receiving component 115 equals or becomes slightly less than the lateral distance d4 between the locking surfaces 142, 152 of the counterweight assembly 100. This compression of the lateral dimension d3 of the receiving component 115 also loads the intermediate portion 158 with a spring force that urges the locking edges 162, 164 into the corresponding locking surfaces 142, 152 on the counterweight assembly 100. This force assists with a strong frictional and spring loaded attachment of the counterweight assembly 100 to the receiving component 115. The locking edges 162 of the apertures 160 force themselves into the locking surfaces 152 of the retention members 105 and the locking edge 164 forces itself into the locking surface 142 of the retention flange 107. Thus, it should be appreciated that in order to remove the counterweight assembly 100 from the receiving component 115 the intermediate portion 158 of the receiving component 115 must be further urged in the counter-clockwise direction relative to FIG. 7 so as to release the load and allow the retention flange 107 of the counterweight assembly 100 to be rotated out of engagement with the locking edge 164 of the flange portion 156.

In some versions, the retention flange 107 can include a profiled lip 168 adjacent to the locking surface 142 such that frictional engagement between the profiled lip 168 and the locking edge 164 urges the intermediate portion 158 to pivot into and/or out of the loaded position during attachment and detachment of the counterweight assembly 100. In other versions, a user can manually apply a force to the intermediate portion 158 to move the locking edge 164 into and out of engagement with locking surface 142 of the retention flange 107.

It should be appreciated that the counterweight assembly 100 disclosed in FIGS. 1-7 provides for a simple construct that can easily and effectively be attached to a receiving component 115 without the need for additional fasteners, tools, or any special training. Moreover, the integral housing 104 provides an effective cushion between the counterweight 100 and the receiving component 115 for absorbing mechanical vibrations during use of the appliance. As such, the housing 104 reduces noise and the potential for physical degradation of the counterweight 102, which may be caused from vibrations and frictional forces during use.

FIGS. 8-11 depict an alternative version of a counterweight assembly 200 constructed in accordance with the present disclosure. The counterweight assembly 200 includes a counterweight 202 and a housing 204. The counterweight assembly 200 is generally similar to the counterweight assembly 100 described in relation to FIGS. 1-7 with the exception that the counterweight 200 is formed separate from the housing 204, which includes multiple inserts or sleeves 225, 227 attached to the counterweight 200 at key locations.

Figure 9:
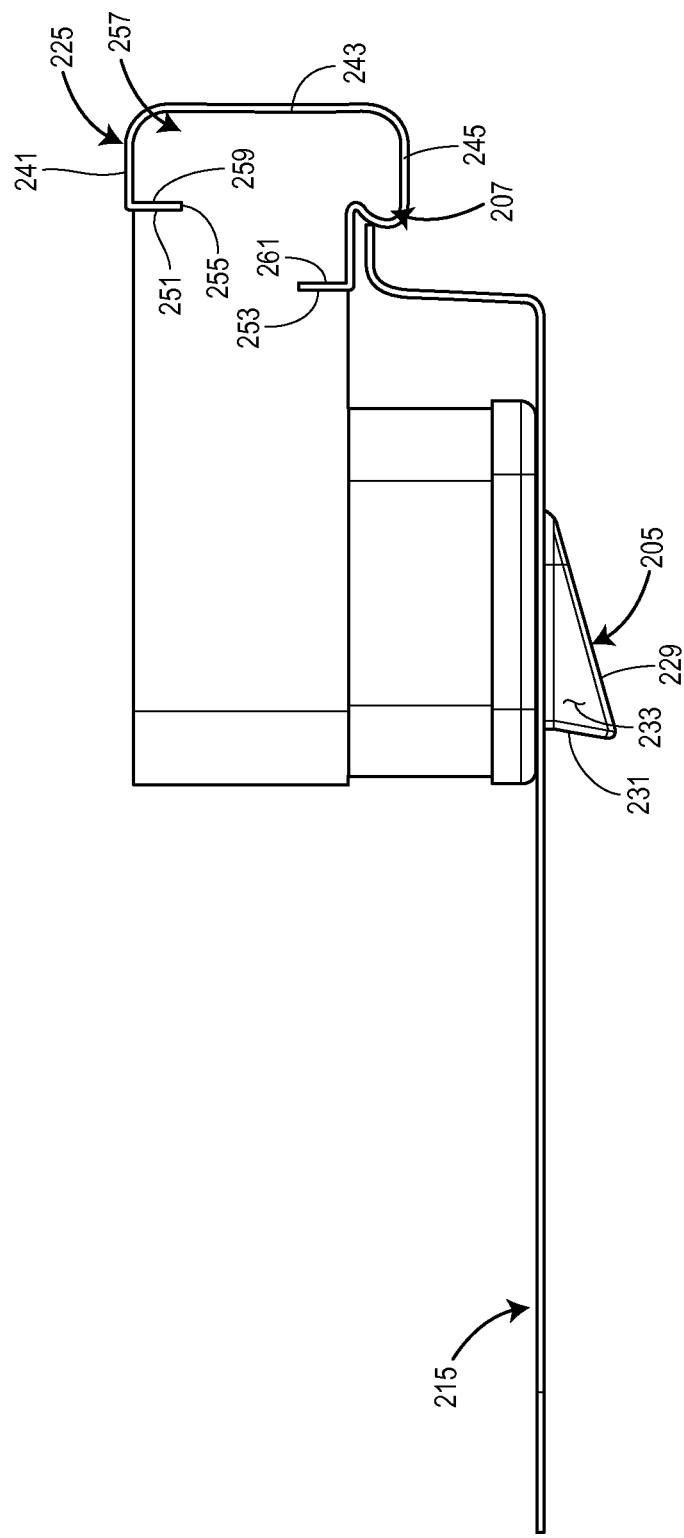
FIG. 9 is a cross-sectional view of the assembly of FIG. 8 with retention members of the counterweight completely inserted into apertures of a counterweight receiving component.
Figure 10:
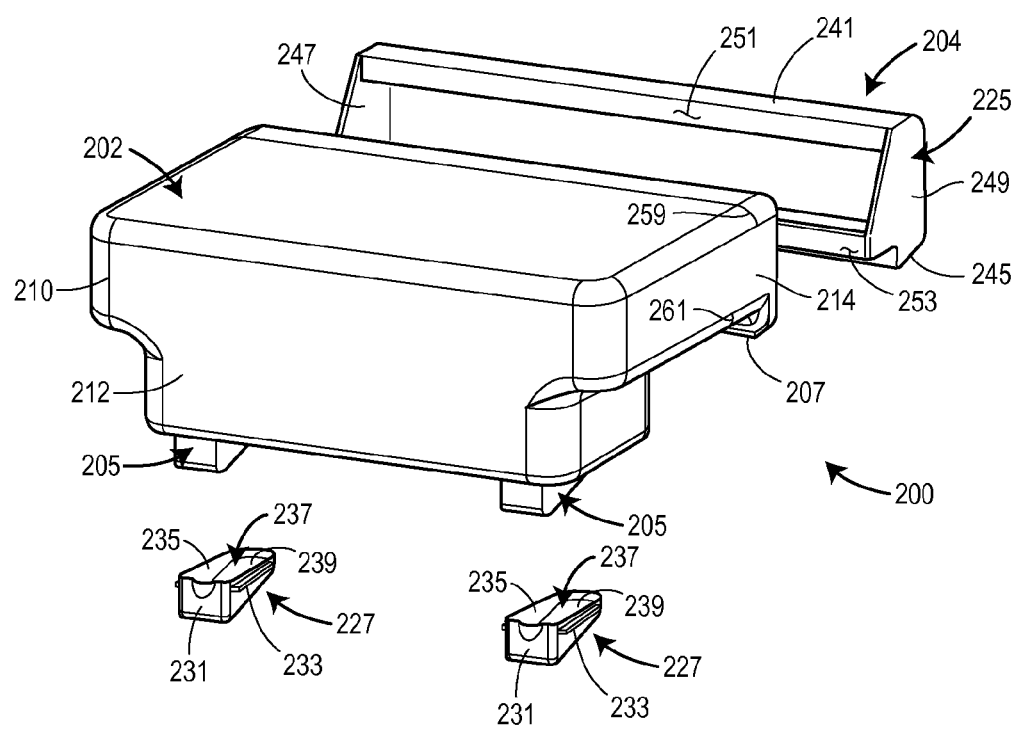
FIG. 10 is an exploded perspective view of the counterweight shown in FIGS. 8 and 9.
Figure 11:
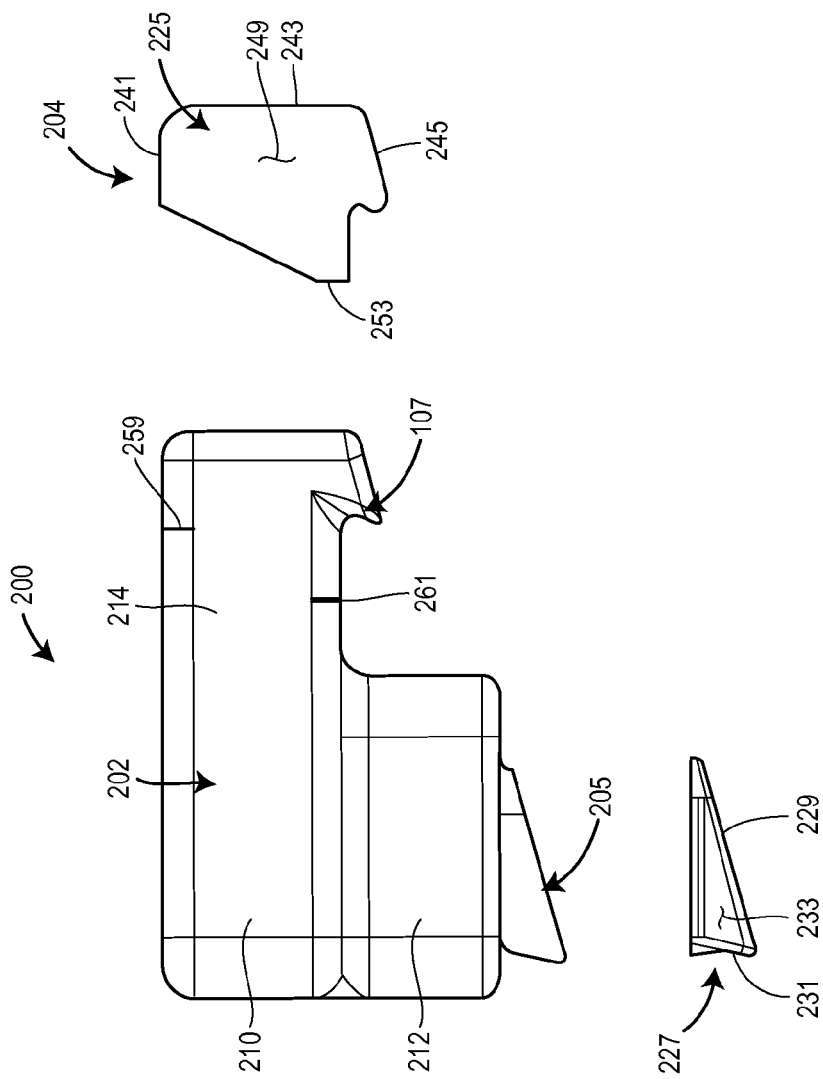
FIG. 11 is an exploded side view of the counterweight shown in FIGS. 8 and 9.

As shown in FIGS. 10 and 11, the counterweight 202 of the counterweight assembly 200 can have a shape that is generally identical to the shape of the counterweight assembly 100 described with reference to FIGS. 1-7. Specifically, the counterweight 202 of this version can include a body portion 210 and a base portion 212. The body portion 210 includes a tongue portion 214 that extends outward at 90° and beyond the base portion 212. Moreover, the counterweight 202 includes a pair of retention members 205 and a retention flange 207, as does the counterweight assembly 100 described previously. The specific details of the counterweight 202 including the various geometries of the body and base portions 210, 212, retention members 205, and retention flange 207 can be identical to those details described above with respect to the counterweight 100 of FIGS. 1-7. As such, those details will not be repeated here but it should be understood that they are incorporated into the present description of the counterweight 202 depicted in FIGS. 8-11.

As mentioned, the counterweight assembly 200 of FIGS. 8-11 includes a housing 204 that includes multiple inserts or sleeves 225, 227. Specifically, the housing 204 includes a retention flange sleeve 225 attached to the retention flange 207 of the counterweight 202 and a pair of retention member inserts 227 attached to the corresponding pair of retention members 205 of the counterweight 202. The sleeve 225 and inserts 227 can be constructed of plastic or another material, for example, and can be formed by blow-molding, thermo-forming, injection molding, casting, stereo-lithography, 3D printing, pressing, cold-forming, or generally any other foreseeable process.

As seen in FIGS. 9-11, for example, each of the inserts 227 includes a generally hollow wedge-shaped structure including a ramp wall 229, a locking wall 231, and a pair of opposing side walls 233, 235 collectively defining an interior cavity 237 and an opening 239 to the interior cavity 237. So configured, the interior cavity 237 of each insert 227 defines a wedge-shape that corresponds to the wedge-shaped retention members 205 on the counterweight 202. As such, the inserts 227 resemble shoes that receive the retention members 205 as they are attached to the counterweight 202.

The retention flange sleeve 225 of the housing 204 of this version is similarly adapted to receive and attach to the retention flange 207 of the counterweight 202. As seen in FIGS. 9-11, the sleeve 225 includes an elongated tubular construct comprising a top wall 241, a front wall 243, a bottom wall 245, and opposing end walls 247, 249. As can best be seen in FIG. 9, for example, the top wall 241 includes a connection flange 251 that extends downwardly toward the bottom wall 245. The bottom wall 245 is shaped in a manner to receive the retention flange 207 of the counterweight 202 and also includes a connection flange 253 extending upwardly toward the top wall 241. The connection flanges 251, 253 are spaced from each other such as to define a slotted opening 255 in the sleeve 225, which provides access to an interior cavity 257. In this version of the counterweight assembly 200, the connection flanges 251, 253 of the sleeve 225 are received within connection slots 259, 261 (see, e.g., FIGS. 9 and 11), respectively, formed in the counterweight 202. This reception provides for a mechanical connection between the sleeve 225 and the counterweight 202 that can further ensure that the sleeve 225 and counterweight 202 are connected securely.

The counterweight 202 of FIGS. 8-11 can be formed and shaped separate from the sleeve 225 and inserts 227 such as in an independent casting, molding or other forming operation. And, subsequently, the sleeve 225 and inserts 227 can be attached to the counterweight 202 with friction, adhesive, mechanical connection, chemical bonding, welding, or some other process. Alternatively, the counterweight 202 can be formed integrally with the sleeve 225 and inserts 227. For example, the sleeve 225 and inserts 227 can first be positioned in a mold, into which the counterweight 202 can be poured and formed. That is, the counterweight 202 can include a concrete and/or other high specific gravity, heavy aggregate material that can be, for example, poured wet into the mold with the housing 204 and then allowed to dry into a solid. As the material dries, the counterweight 202 can adhere to the sleeve 225 and inserts 227 to form the complete counterweight assembly 200. Though this latter forming process, it should be understood that the counterweight 202 can be formed in manner that envelops the connection flanges 251, 253 on the sleeve 225, thereby defining the connection slots 259, 261 in a manner that closely attaches to the sleeve 225. Although not expressly disclosed, the inserts 227 could also be constructed to include one or more flanges or other features that serve a function similar to the connection flanges 151, 153 on the sleeve 225 in order to provide for a mechanical connection between the inserts 227 and the counterweight 202 during the forming process.

Like the counterweight assembly 100 disclosed in FIGS. 1-7, the counterweight assembly 200 disclosed in FIGS. 8-11 also provides for a simple construct that can easily and effectively be attached to a receiving component 215 without the need for additional fasteners, tools, or any special training. The receiving component 215 is generally identical to the receiving component 115 described above, and therefore, its details and the means for connecting the counterweight assembly 200 thereto will not be repeated. The primary distinction between the counterweight assembly 200 in FIGS. 8-11 and the assembly 100 in FIGS. 1-7, as discussed, is the construct of the housing 204. The housing 204 of FIGS. 8-11 is divided into three separate pieces, the sleeve 225 and the pair of inserts 127. But, the housing 204 still provides an effective cushion between the counterweight 202 and the receiving component 215 for absorbing mechanical vibrations during use of the appliance, thereby reducing noise and the potential for physical degradation of the counterweight 202 caused by vibrations and frictional forces during use.

FIGS. 12-15 illustrate another alternative counterweight assembly 300 constructed in accordance with the present disclosure. The counterweight assembly 300 is similar to the counterweight assembly 100 described with reference to FIGS. 1-7 in that it includes a counterweight 302 and a housing 304 that can include a plastic container, for example, defining a pour spout 306 and an interior cavity (not shown). The housing 304 can be formed by blow-molding, thermo-forming, injection molding, casting, stereo-lithography, 3D printing, or generally any other foreseeable process. The housing 304 can include a single piece of material or can include multiple pieces connected (e.g., bonded, welded, glued, etc.) together to form the shape illustrated. The counterweight 302 can include a concrete and/or other high specific gravity, heavy aggregate material that can be, for example, poured into the interior cavity (not shown) of the housing 304 wet and then allowed to dry into a solid. So configured, the counterweight 302 and the housing 304 become coupled together at least by virtue of the geometry of the housing 304. Also, in some versions, it is possible that the counterweight 302 and housing 304 may bond together through some degree of adhesion.

Figure 12:
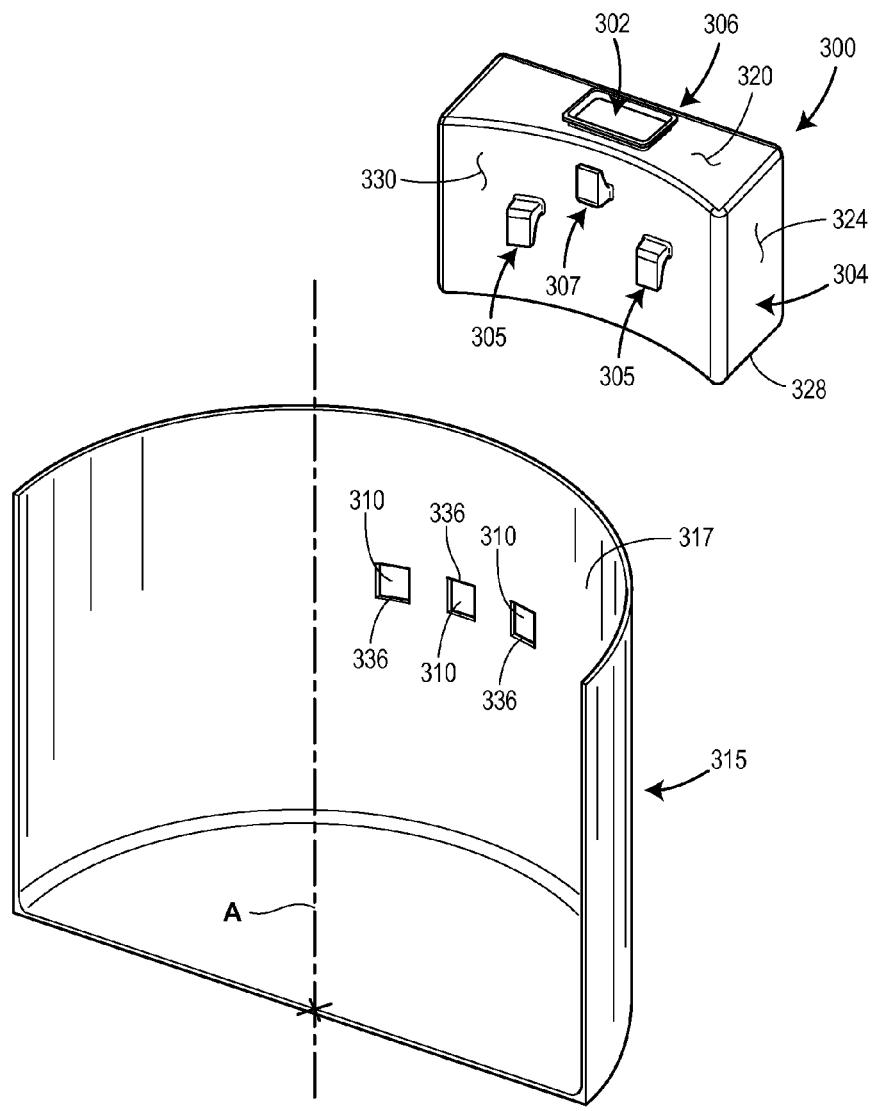
FIG. 12 is an exploded view of another alternative assembly of the present disclosure including a counterweight that can attach to a rounded surface of a counterweight receiving component.
Figure 13:
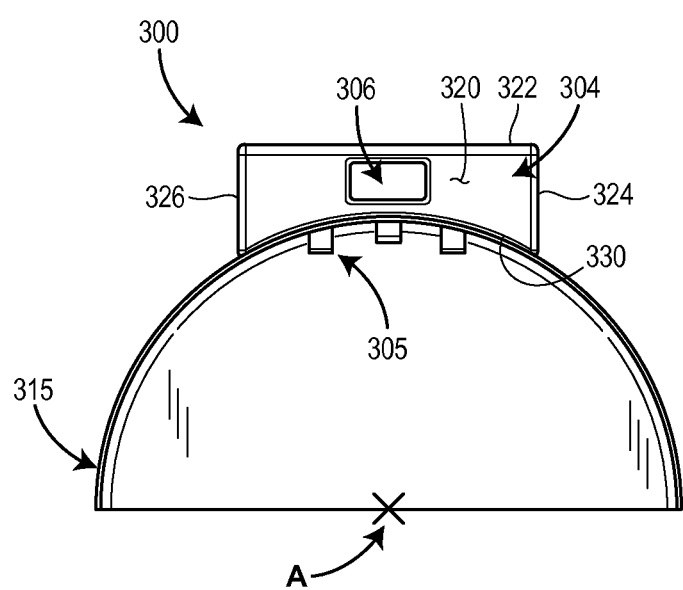
FIG. 13 is a top view of the assembly of FIG. 12 with the counterweight attached to the counterweight receiving component.
Figure 14:
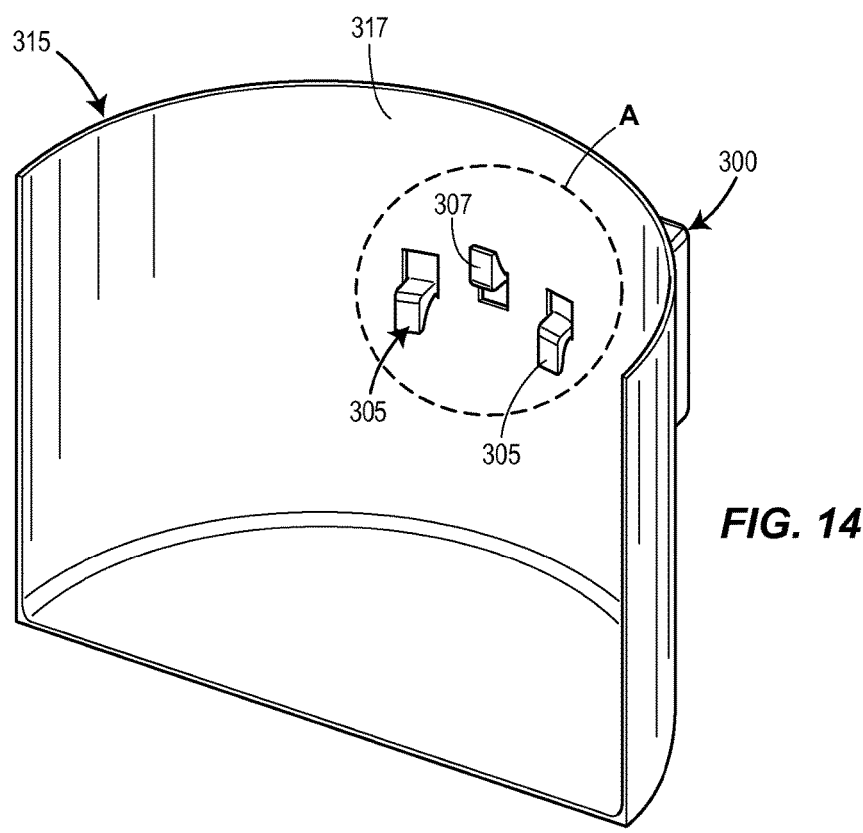
FIG. 14 is a perspective view of the assembled assembly of FIG. 13.
Figure 15:
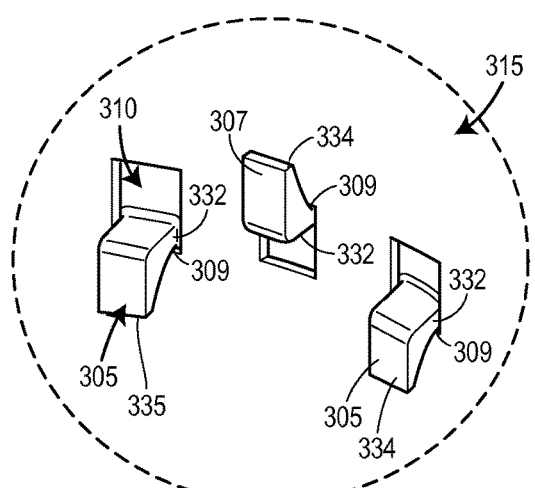
FIG. 15 is a detail view taken from circle A in FIG. 14.

As depicted, the housing 304 of the counterweight assembly 300 depicted in FIGS. 12-15 is generally box-shaped with a top wall 320, a front wall 322, opposing side walls 324, 326, and a bottom wall 328, each of which are generally planar. Additionally, the housing 304 includes a bearing wall 330 that is curved inwardly about a central axis A (shown in FIGS. 12 and 13) extending vertically relative to the orientation of FIG. 12. The top wall 320 defines the pour spout 306. The housing 304 includes an upwardly directed retention member 307 and a pair of downwardly directed retention members 305 extending from the bearing wall 330. As shown in FIG. 12, for example, each of the retention members 305, 307 includes a base end 332 connected to the bearing wall 330 and a free end 334 disposed away from the bearing wall 330. Furthermore, the retention members 305, 307 of this version are wedge-shaped such that they have a thickness dimension that converges from the base ends 332 to the free ends 334, as shown in FIG. 15. As such, the free end 334 of the upwardly directed retention member 307 is positioned above the base end 332 of the upwardly directed retention member 307. And, the free ends 334 of the downwardly directed retention members 305 are positioned below the base ends 332 of the downwardly directed retention members 305, relative to the orientation of FIG. 12.

The counterweight assembly 300 in FIGS. 12-15 is configured to attach to an appliance receiving component 315 that is generally cylindrical in shape such as a dryer drum or other component, as partially shown in FIGS. 13 and 14. That is, the receiving component 315 includes a generally cylindrical base wall 317 that defines three apertures 310, each adapted to receive one of the retention members 305, 307 of the counterweight assembly 300. The radius of curvature of the base wall 317 corresponds to the radius of curvature of the bearing wall 330 of the counterweight assembly 300 such that the counterweight assembly 300 fits snugly adjacent to the cylindrical receiving component 315.

Similar to prior versions, each of the apertures 310 in the receiving component includes a locking edge 336 that contacts and engages a locking surface 309 on one of the retention members 305, 307 of the counterweight assembly 300. In the present version, there are three apertures 310, each corresponding to one of the three retention members 305, 307 on the counterweight assembly 300. The middle aperture 310 corresponds to the upwardly extending retention member 307 and, therefore, the locking edge 336 of the middle aperture 310 includes a top edge of the aperture 310, relative to the orientation of FIGS. 12, 14 and 15. The two remaining apertures 310, which are positioned on opposite sides of the middle aperture 310, correspond to the downwardly extending retention members 305. Therefore, the locking edges 336 of those two apertures 310 are positioned at the bottom of the apertures 310, relative to the orientation of FIGS. 12, 14 and 15.

So configured, as shown in FIG. 15, when the counterweight assembly 300 is attached to the receiving component 315, the upwardly extending retention member 307 passes through the middle aperture 310 and the locking surface 309 engages the corresponding locking edge 336 (e.g., the upper edge of the aperture 310). Similarly, the downwardly extending retention members 305 pass through the outside apertures 310 and the locking surfaces 309 engage the corresponding locking edges 336 (e.g., the lower edges of the apertures 310). In this manner, the downwardly extending retention members 305 limit displacement of the counterweight assembly 300 in a downward direction relative to the orientation of FIG. 15 and the upwardly extending retention member 307 limits displacement in an upward direction.

In the version disclosed in reference to FIGS. 12-15, the apertures 310 in the receiving component 315 are positioned generally aligned across a horizontal line relative to the orientation of the Figs. As such, depending on the specific geometries and sizes of the retention members 305, 307 and apertures 310, different techniques can be used to facilitate attachment and detachment of the counterweight assembly 300 to and from the receiving component 315. For example, in the disclosed version, the base end 332 of the upwardly extending retention member 307 may include a flexible hinge (not shown) that allows a user to pivot the retention member 307 about the base end 332 and downward toward the other retention members 305. When occupying this position, all of the retention members 305, 307 can be inserted through the apertures 310 without interference. Once inserted, the upwardly extending retention member 307 can be released and the flexible hinge could naturally bias the retention member 307 back into the position depicted in FIGS. 14 and 15, for example. To detach the counterweight assembly 300 from the receiving component 315, a similar process can be performed in reverse. That is, a user can simply pivot the retention member 307 such that all of the retention members 305, 307 can be simultaneously removed from the apertures 310. In other versions, the upwardly extending retention member 307 can be fixed and the downwardly extending retention members 305 could include flexible hinges, or all of the retention members 305, 307 could have flexible hinges as described. In one version, the flexible hinge is nothing more than a portion of the plastic housing 304 that is susceptible to being flexed under the application of force and, in some cases, that portion is resilient to return the retention member(s) 305, 307 back to the depicted position. In other versions, the flexible hinge could include a spring or other component attached to or formed in the housing 304. In still other versions, the retention member(s) 305, 307 do not include flexible hinges at all.

Figure 16:
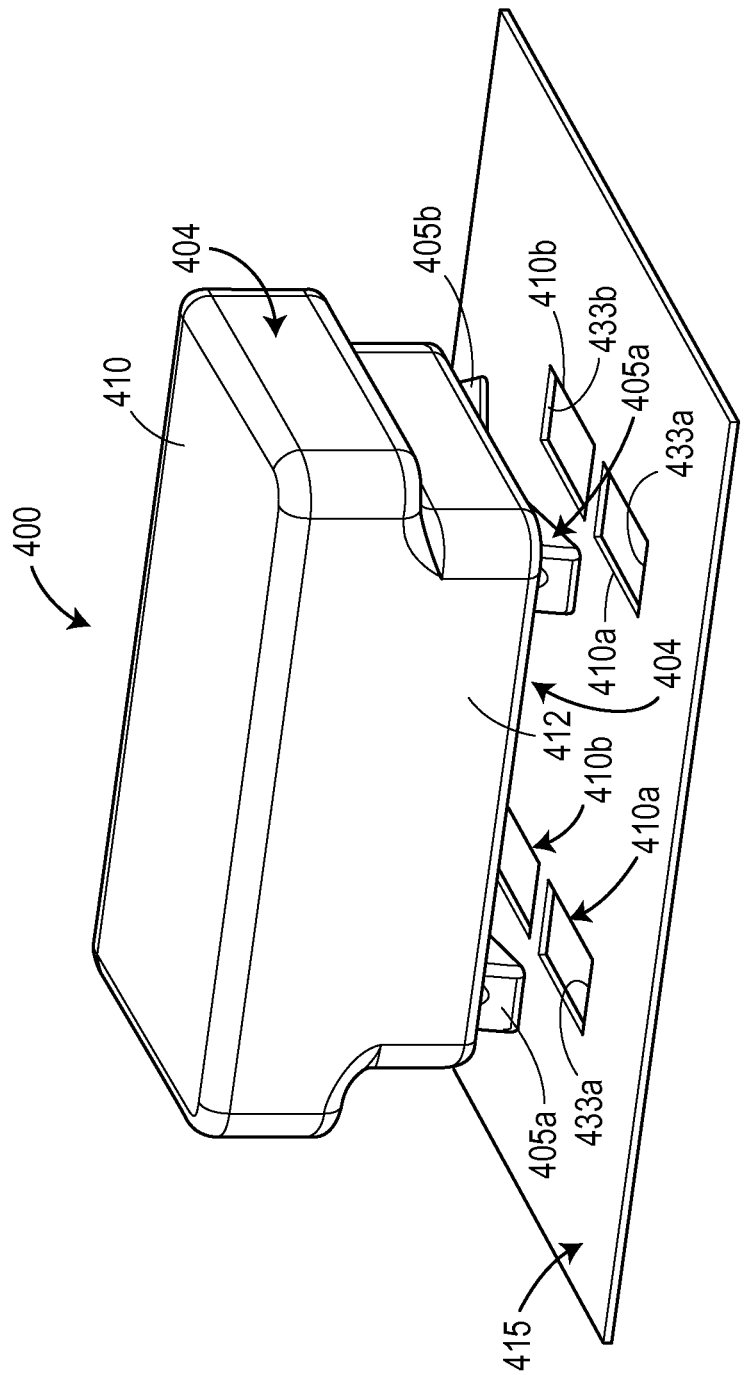
FIG. 16 is an exploded perspective view of another alternative assembly of the present disclosure including a counterweight that can attach to a counterweight receiving component.
Figure 19:
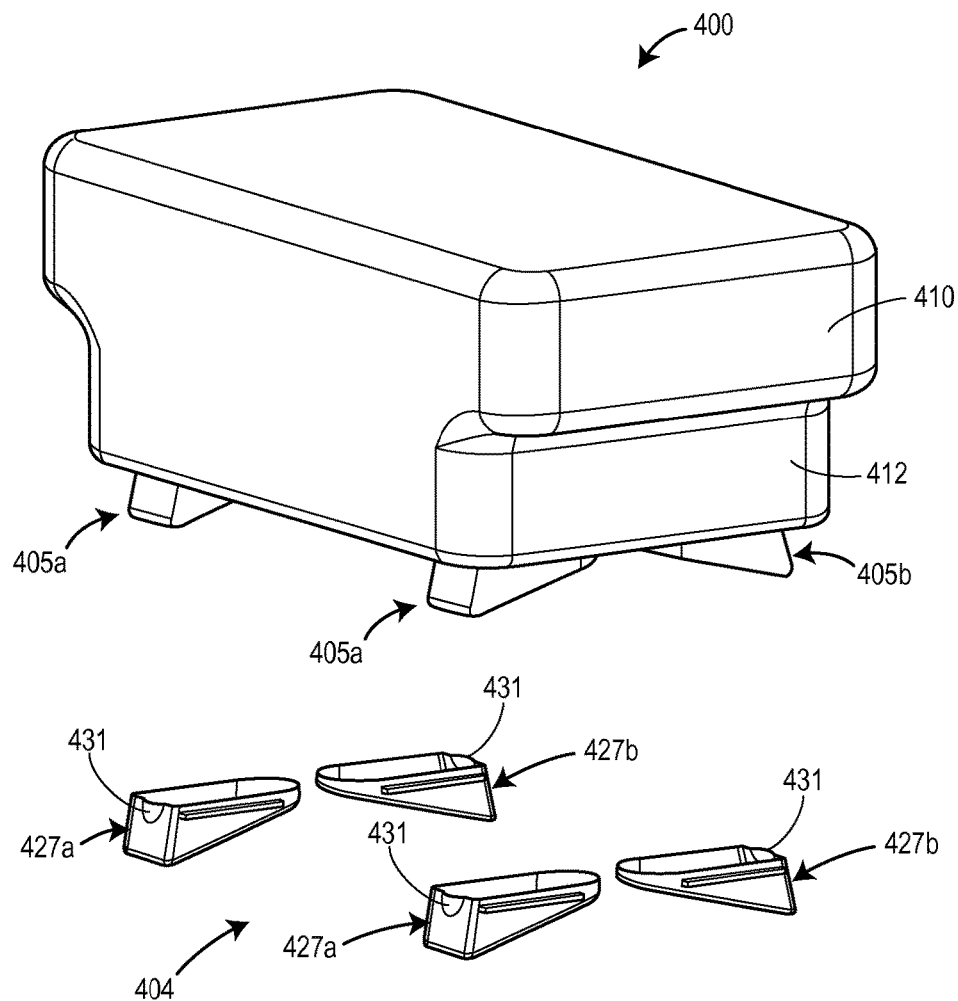
FIG. 19 is an exploded perspective view of yet another alternative counterweight in accordance with the present disclosure.

FIGS. 16-19 depict yet another version of a counterweight assembly 400 constructed in accordance with the present disclosure. The counterweight assembly 400 includes a counterweight 402 and a housing 404. The counterweight assembly 400 is generally similar to the counterweight assemblies 200 described in relation to FIGS. 8-11 with the exception that the counterweight 400 does not include a tongue portion 214 and retention flange 207. Instead, as depicted in FIGS. 16 and 19, for example, the counterweight 402 is generally block shaped and includes first and second pairs of retention members 405a, 405b.

Figure 17:
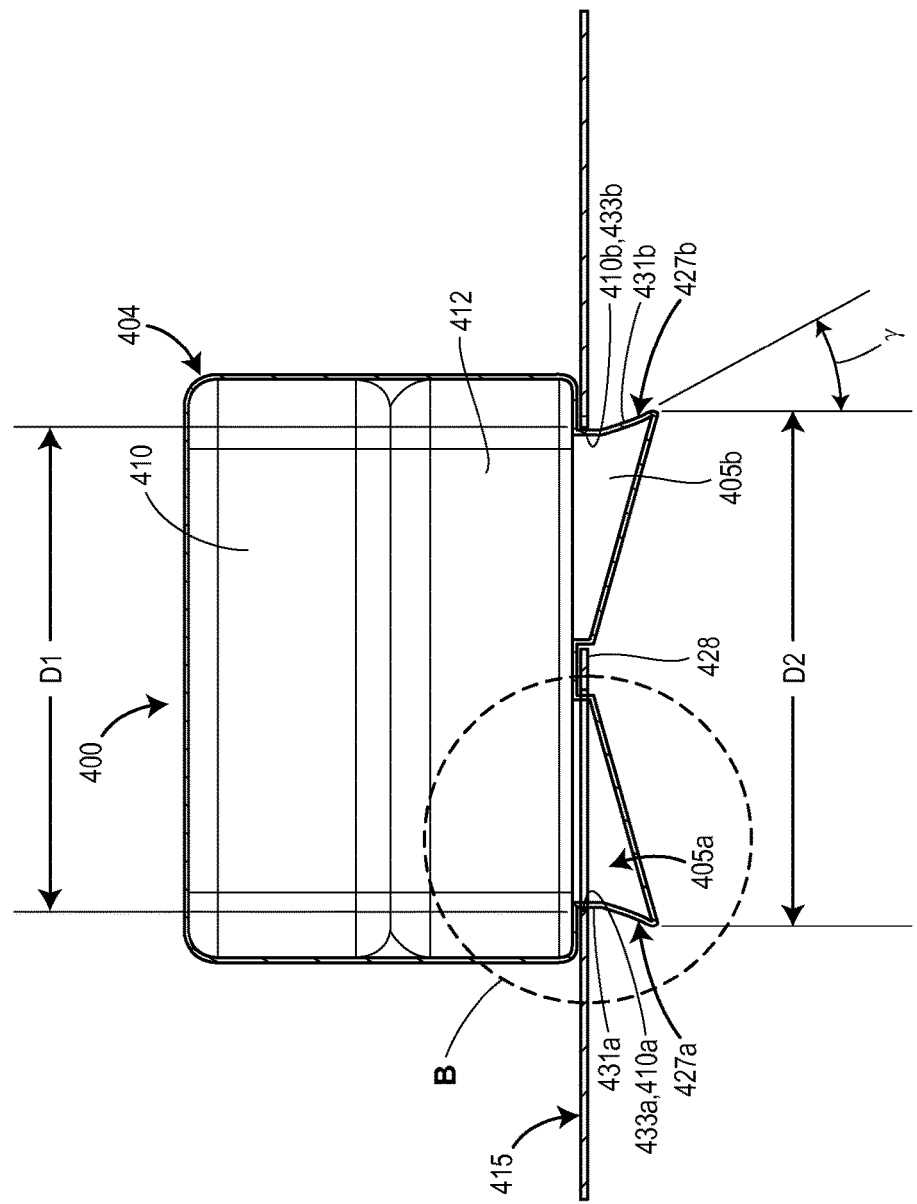
FIG. 17 is side view of the assembly of FIG. 16 with the counterweight attached to the counterweight receiving component.
Figure 18:
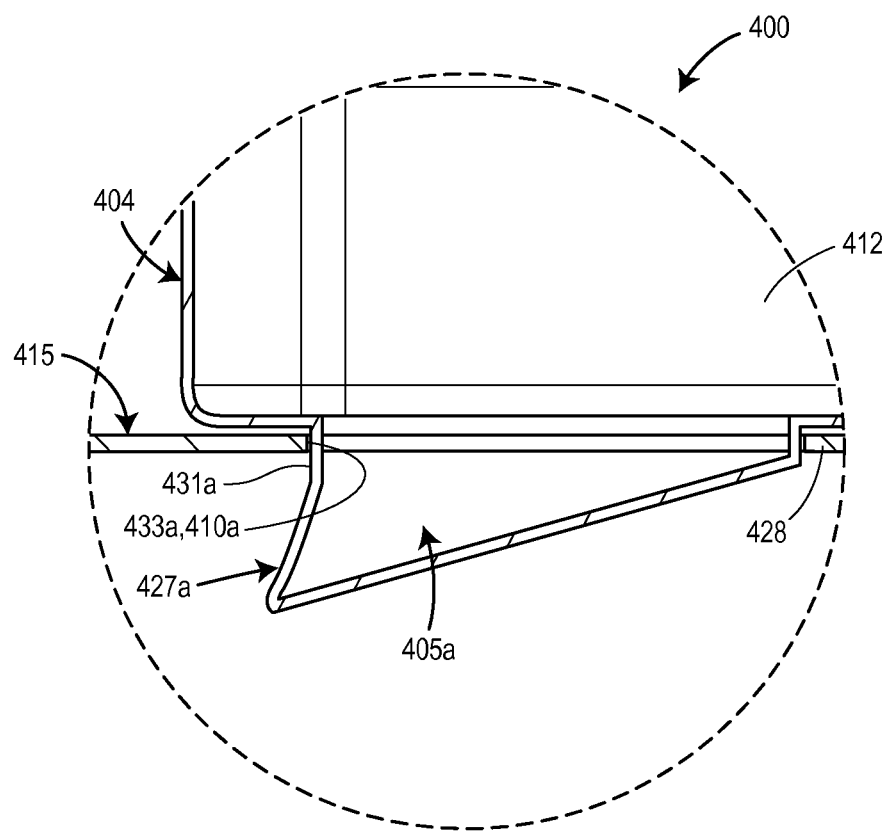
FIG. 18 is a detail view taken from circle B of FIG. 17.

More specifically, the counterweight 402 of this version can include a body portion 410 and a base portion 412. Besides the fact that the body portion 410 lacks a tongue portion and retention flange, the body portion 410 and base portion 412 can be identical to those described above in reference to FIGS. 1-7 and 8-11, for example. As such, only particular details will be repeated as needed. Like with the counterweight 200 in FIGS. 8-11, the body portion 410 is slightly wider than the base portion 412, but that does not have to be the case in either the present version or that disclosed in any of the previous versions. The first and second pairs of retention members 405a, 405b are disposed on a bottom surface 428 of the base portion 412. The first pair of retention members 405a are identical to the pair of retention members 205 described above with respect to FIGS. 8-11 as are the second pair of retention members 405b, with the exception that the second pair 405b are mirror images of the first pair 405a, as can be seen in FIG. 17. All other geometric details of the retention members 405a, 405b are the same as that described above with respect to FIGS. 1-7 and 8-11 and therefore the description of those details is also incorporated into FIGS. 12-16.

As mentioned, the counterweight assembly 400 of FIG. 19 includes a housing 404, and that includes first and second pairs of retention member inserts 427a, 427b. The first pair of retention member inserts 427a are attached to the corresponding first pair of retention members 405a and the second pair of retention member inserts 427b are attached to the corresponding second pair of retention members 405b. The inserts 427a, 427b can be constructed of plastic or another material, for example, and can be formed by blow-molding, thermo-forming, injection molding, casting, stereo-lithography, 3D printing, or generally any other foreseeable process. Moreover, each insert 427a, 427b is generally identical to the inserts 227 described above with respect to FIGS. 9-11 and therefore the details are incorporated here and need not be repeated.

Like the counterweight 202 of FIGS. 8-11, the counterweight 402 of FIG. 19 can be formed and shaped separate from the inserts 427a, 427b such as in an independent casting, molding or other forming operation. And, subsequently, the inserts 427a, 417b can be attached to the counterweight 402 with friction, adhesive, mechanical connection, chemical boding, welding, or some other process. Alternatively, the counterweight 402 can be formed integrally with the inserts 427a, 427b by forming the counterweight 402 in a mold in which the inserts 427a, 427b reside, as described above with respect to the counterweight 202 of FIGS. 8-11.

From the figures and description, it should be appreciated that the counterweight assembly 400 in FIGS. 16-19 provides yet another simple construct that can easily and effectively be attached to a receiving component 415 without the need for additional fasteners, tools, or any special training. The receiving component 415 is generally identical to previously described receiving components in that it generally includes a flat piece of plat-like material, such as sheet metal, for example. In FIGS. 16-19, the receiving component 415 includes first and second pairs of apertures 410a, 410b arranged at the corners of a rectangular pattern in order to accommodate the corresponding configuration of retention members 407a, 407b.

So configured, in order to attach the counterweight assembly 400 to the receiving component 415, a user may, for example, first position the first pair of retention members 427a into the first pair of apertures 410a such that locking surfaces 431a of the first pair of retention members 407a contact and engage locking edges 433a of the first pair of apertures 410a. Then, the user may pivot the counterweight assembly 400 about the line of contact between the first pair of retention members 407a and the locking edges 433a such as to move the second pair of retention members toward the second pair of apertures 410b. Due to the shape and configuration of the retention members 407a, 407, as can be seen in FIG. 17, for example, the user may have to exert a substantial amount of force to position the second pair of retention members 407b through the second pair of apertures 410b. This is due to the angle γ of the locking surfaces 431a, 431b of the retention members 407a, 407b, which results in a distance D1 between the locking edges 433a, 433b of the apertures 410a, 410b (see in FIG. 17) being smaller than a distance D2 between the outer extremities of the retention members 407a, 407b. Regardless of the assembly process, this version of the counterweight assembly 400 like those before it, advantageously provide for a housing 404 that exhibits cushioned contact points between counterweight assembly 400 and the receiving component 415, which advantageously reduces vibrations and noise. Further still, this construct like the others before it, advantageously provide for a counterweight assembly that is easily attached to and detached from the corresponding receiving component without needing special skills, tools, or fasteners, thereby resulting in cost and time savings.

While the foregoing disclosure provides various versions of counterweight assemblies, with and without corresponding receiving components, the present disclosure should not be limited to the specific versions disclosed. Rather, these versions are merely examples of the invention, which is defined by the spirit and scope of the following claims. The invention includes not only what is specifically described herein but also all equivalents falling within the scope of the invention as would be understood by a person having ordinary skill in the art.

What is claimed:

1. A counterweight assembly, comprising:
a counterweight formed of concrete or other heavy aggregate material, the counterweight at least partially defined by an upper surface and a lower surface, wherein the counterweight does not have a hole extending through the upper surface and the lower surface configured for receiving a fastener;
at least one retention member coupled to the counterweight, the at least one retention member being generally wedge shaped and defining a locking surface extending transversely beyond a portion of the retention member, the at least one retention member extending outwardly away from the counterweight, the at least one retention member configured to be at least partly disposed through an aperture in a counterweight receiving component such that the locking surface at least partially retains the counterweight in operable connection with the counterweight receiving component.

2. The assembly of claim 1, wherein the at least one retention member is at least partly formed of a plastic material.

3. The assembly of claim 1, further comprising a housing partly defining the at least one retention member and substantially surrounding the counterweight.

4. The assembly of claim 1, wherein the at least one retention member includes a void filled by a portion of the counterweight.

5. The assembly of claim 1, wherein the at least one retention member comprises a plurality of retention members.

6. The assembly of claim 1, wherein the at least one retention member comprises a tapered wedge shape, a ramp shape, a barb shape, or a hook shape.

7. The assembly of claim 1, wherein the at least one retention member includes an angled locking surface adapted to frictionally engage a locking edge of a corresponding counterweight receiving component.

8. A counterweight assembly, the assembly comprising:
a counterweight at least partly formed of concrete or other heavy aggregate material, the counterweight at least partially defined by an upper surface and a lower surface, wherein the counterweight does not have a hole extending between the upper surface and the lower surface configured for receiving a fastener;
a counterweight receiving component defining at least one aperture; and
at least one retention member coupled to the counterweight and extending outwardly away from the counterweight and being generally wedged shaped and defining a locking surface, the at least one retention member disposed at least partly through the at least one aperture such that the locking surface is in frictional engagement with the counterweight receiving component, thereby attaching the counterweight to the counterweight receiving component without additional hardware.

9. The assembly of claim 8, wherein the at least one retention member is at least partly formed of a plastic material.

10. The assembly of claim 8, further comprising a housing partly defining the at least one retention member and substantially surrounding the counterweight.

11. The assembly of claim 8, wherein the at least one retention member includes a plastic component including a void filled by a portion of the counterweight.

12. The assembly of claim 8, wherein the at least one retention member comprises a plurality of retention members.

13. The assembly of claim 8, wherein the at least one retention member comprises a tapered wedge shape, a ramp shape, a barb shape, or a hook shape.

14. The assembly of claim 8, wherein the counterweight receiving component is a metal plate.

15. The assembly of claim 8, wherein the assembly does not include bolts, nuts, washers, or screws.

16. The assembly of claim 8, wherein frictional engagement is the sole means coupling the counterweight to the counterweight receiving component.

17. The assembly of claim 8, wherein the at least one retention member includes and angled locking surface functionally engaging a locking edge on the counterweight receiving component to secure the counterweight in position.

18. An appliance, a piece of furniture, or another consumer product comprising an assembly of claim 1.

* * * * *